US012679150B2

(12) United States Patent
Tauch

(10) Patent No.: US 12,679,150 B2
(45) Date of Patent: Jul. 14, 2026

(54) TIRE INFLATION APPARATUS

(71) Applicant: Kyle David Tauch, Houston, TX (US)

(72) Inventor: Kyle David Tauch, Houston, TX (US)

( * ) Notice: Subject to any disclaimer, the term of this patent is extended or adjusted under 35 U.S.C. 154(b) by 0 days.

(21) Appl. No.: 18/904,180

(22) Filed: Oct. 2, 2024

(65) Prior Publication Data

US 2025/0027490 A1     Jan. 23, 2025

Related U.S. Application Data

(63) Continuation-in-part of application No. 18/666,380, filed on May 16, 2024.

(60) Provisional application No. 63/466,796, filed on May 16, 2023.

(51) Int. Cl.
| | |
|---|---|
| *B60C 23/12* | (2006.01) |
| *F04B 35/00* | (2006.01) |
| *F04B 37/10* | (2006.01) |
| *F04B 39/10* | (2006.01) |
| *F04B 39/12* | (2006.01) |
| *F16K 15/02* | (2006.01) |
| *F16K 15/06* | (2006.01) |

(52) U.S. Cl.
CPC .......... *B60C 23/135* (2020.05); *B60C 23/126* (2020.05); *F04B 35/00* (2013.01); *F04B 37/10* (2013.01); *F04B 39/1046* (2013.01); *F04B 39/126* (2013.01); *F16K 15/021* (2013.01); *F16K 15/025* (2013.01); *F16K 15/063* (2013.01); *B60C 23/124* (2020.05)

(58) Field of Classification Search
CPC ... B60C 23/135; B60C 23/126; B60C 23/124; F04B 35/00; F04B 37/10; F04B 39/124; F04B 39/126; F16K 15/021; F16K 15/025; F16K 15/063
See application file for complete search history.

(56) References Cited

U.S. PATENT DOCUMENTS

| | | |
|---|---|---|
| 8,662,127 B2 | 3/2014 | Hinque et al. |
| 2005/0279439 A1 | 12/2005 | Wessman, Sr. |
| 2016/0089934 A1 | 3/2016 | Krefting |

FOREIGN PATENT DOCUMENTS

| | | | |
|---|---|---|---|
| CN | 104626893 B | 11/2017 | |
| JP | 2011157059 A | * 8/2011 | ........... B60C 23/135 |
| WO | 2004/011333 A1 | 2/2004 | |

OTHER PUBLICATIONS

Translation of Abstract of JP 2011157059A Kaketa. (Year: 2011).*
International Search Report and Written Opinion (Nine (9) sheets), which was received in corresponding international application No. PCT/US2024/029722; Mailed Aug. 15, 2024.

* cited by examiner

*Primary Examiner* — Charles G Freay
(74) *Attorney, Agent, or Firm* — Alexander B. Uber; Gray Reed

(57) ABSTRACT

Apparatus and methods for tire inflation using an apparatus. The apparatus contains a piston in a housing and a bladder attached at an end of the housing. The apparatus is configured to compress air between a cap, the housing, and piston from the bladder compressing. Air enters into the tire through a valve in the piston. When the bladder decompresses, the piston seals air in the tire, thereby enabling air to pass through the valve in the cap. The apparatus involves a method of maintaining air pressure in a tire. The method includes the apparatus for inflating the tire as the tire rotates over a surface.

8 Claims, 13 Drawing Sheets

704

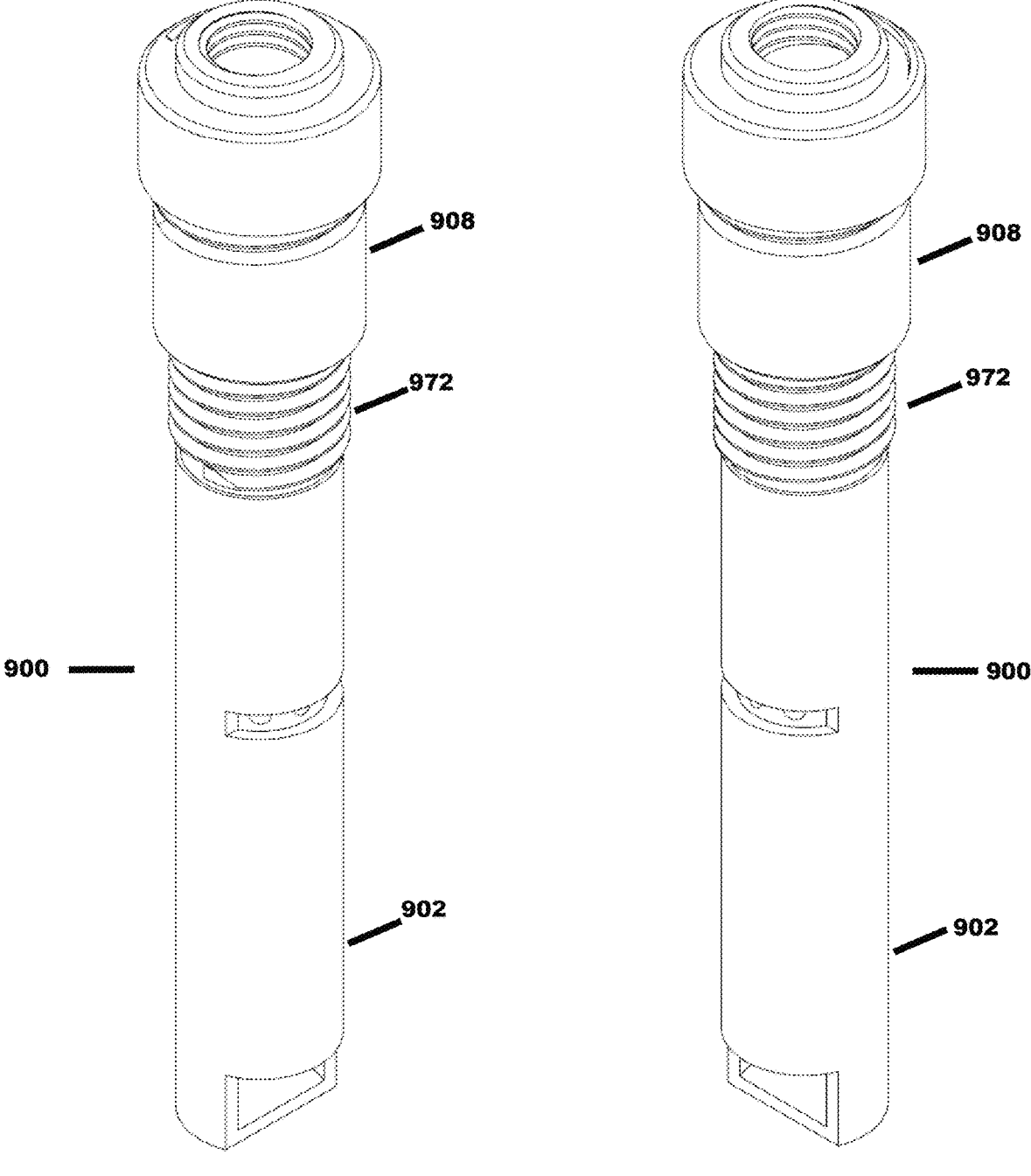
FIG. 9A             FIG. 9B

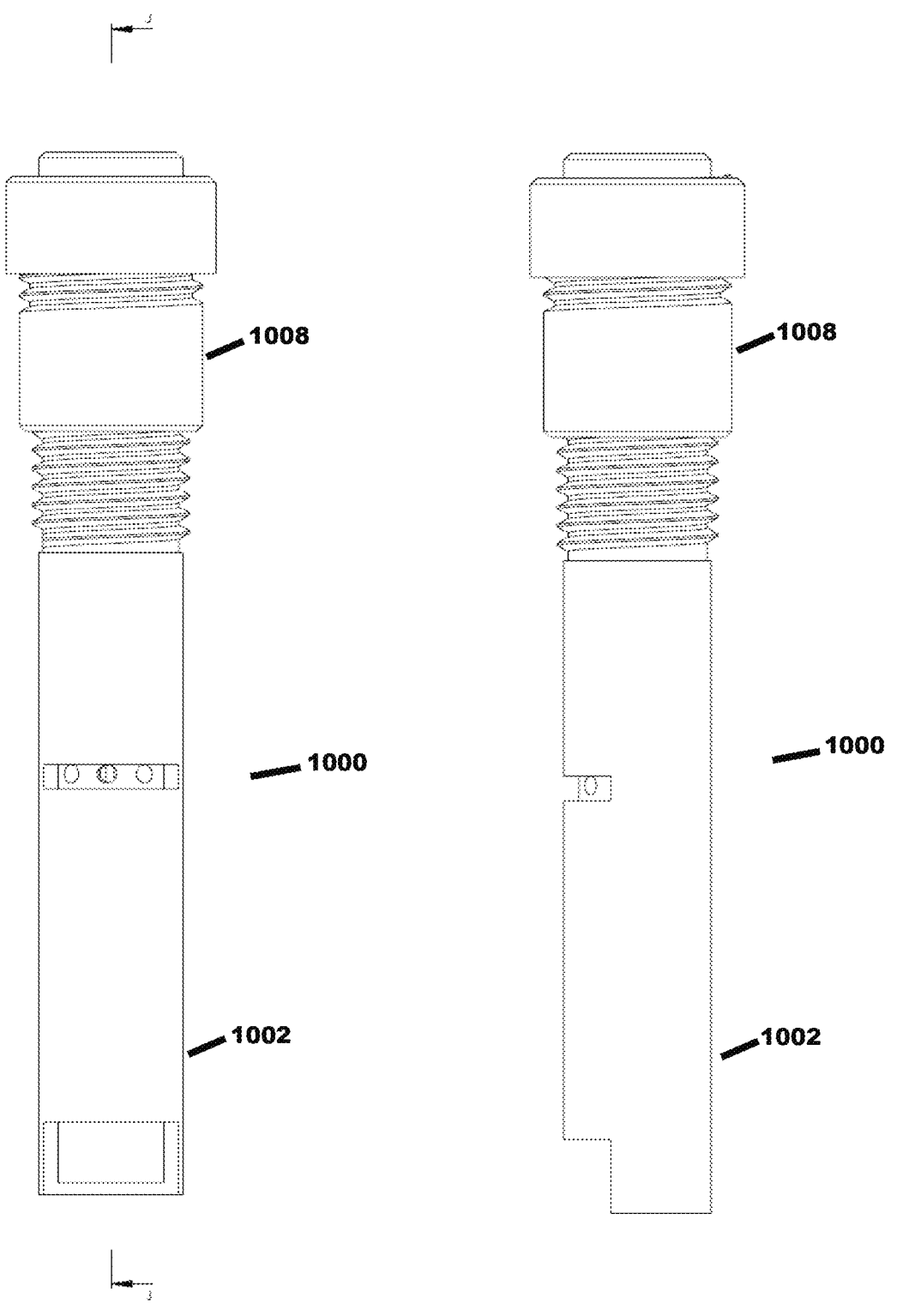
FIG. 10A          FIG. 10B

TIRE INFLATION APPARATUS

CITATION TO PRIOR APPLICATIONS

The present application is a Continuation-In-Part of and claims priority to U.S. Nonprovisional application Ser. No. 18/666,380, titled "TIRE INFLATION APPARATUS" and filed on May 16, 2024, which claims priority to U.S. Provisional Application No. 63/466,796, titled "TIRE INFLATION APPARATUS" and filed May 16, 2023, and all references therein are entirely incorporated by reference herein.

BACKGROUND

Technical Field

The present disclosure is related to the field of tire valve stems and more particularly to a tire inflation apparatus and method.

Description of Related Art

Tires are pneumatically inflated structures attached to vehicles. When full of air at an optimal air pressure, tires provide a flexible cushion that can absorb shocks to the vehicle as it rolls across surfaces. However, tires gradually lose air over time and become flat. Flat tires can lead to serious damage to the tire itself, to the vehicle, and to its occupants. Manually refilling air into tires takes time and might not be possible without special equipment on hand. Therefore, there exists a need to inflate tires automatically.

BRIEF SUMMARY

Novel aspects of the present disclosure are directed to a tire inflation apparatus and method. The apparatus contains a piston having one or more chambers disposed in a housing. One or more bladders are attached at one end of the housing and a cap is attached at the other end of the housing which protrudes outside of the tire. The apparatus is configured to compress air to fill a tire as the tire deforms from insufficient air pressure while rotating over a surface.

In a non-limiting illustrative embodiment, the tire inflation apparatus may comprise a housing configured to be embedded inside a tire, a piston disposed within the housing, a spring disposed within the housing, and a bladder coupled to the second end of the housing. The housing may comprise one or more apertures, and the piston may comprise one or more chambers. The one or more chambers may be configured to be in fluid communication with the one or more apertures of the housing. The spring may extend from a first end of the housing to a first end of the piston, wherein the spring may be configured to place the piston between the first end and a second end of the housing. The bladder can be coupled to the second end of the housing, wherein the second end opposes the first end. A volume of the bladder is configured to be in fluid communication with the one or more chambers of the piston.

In another non-limiting illustrative embodiment, the present disclosure is directed to a method for maintaining tire pressure using the tire inflation apparatus. The method includes embedding the tire inflation apparatus inside of the tire and sealing air in the bladder when the bladder and the one or more chambers have the same air pressure. When the tire is being inflated, the spring may place the piston into a first position. The method may further include forcing air into the tire from the one or more chambers when the tire loses air pressure. When the air is being forced into the tire, the spring may place the piston into a second position. The method may further include forcing air into the housing through an exposed end of the housing, thereby enabling air to be forced into the tire when the piston is subsequently placed in the second position. When the air is forced into the housing, the spring may place the piston in a third position.

Other aspects, embodiments, and features of the present disclosure will become apparent from the following Detailed Description when considered in conjunction with the accompanying Figures.

BRIEF DESCRIPTION OF THE DRAWINGS

The preceding aspects and many of the attendant advantages of the present technology will become more readily appreciated by reference to the following Detailed Description when taken in conjunction with the accompanying simplified drawings of example embodiments. The drawings briefly described below are presented for ease of explanation and do not limit the scope of the claimed subject matter.

FIG. 9A is a perspective view of a tire inflation apparatus having a pressure adjuster.

FIG. 9B is a perspective view of a tire inflation apparatus having a pressure adjuster.

FIG. 10A is a front view of a tire inflation apparatus having a pressure adjuster.

FIG. 10B is a side view of a tire inflation apparatus having a pressure adjuster.

DETAILED DESCRIPTION

Figure 1A:
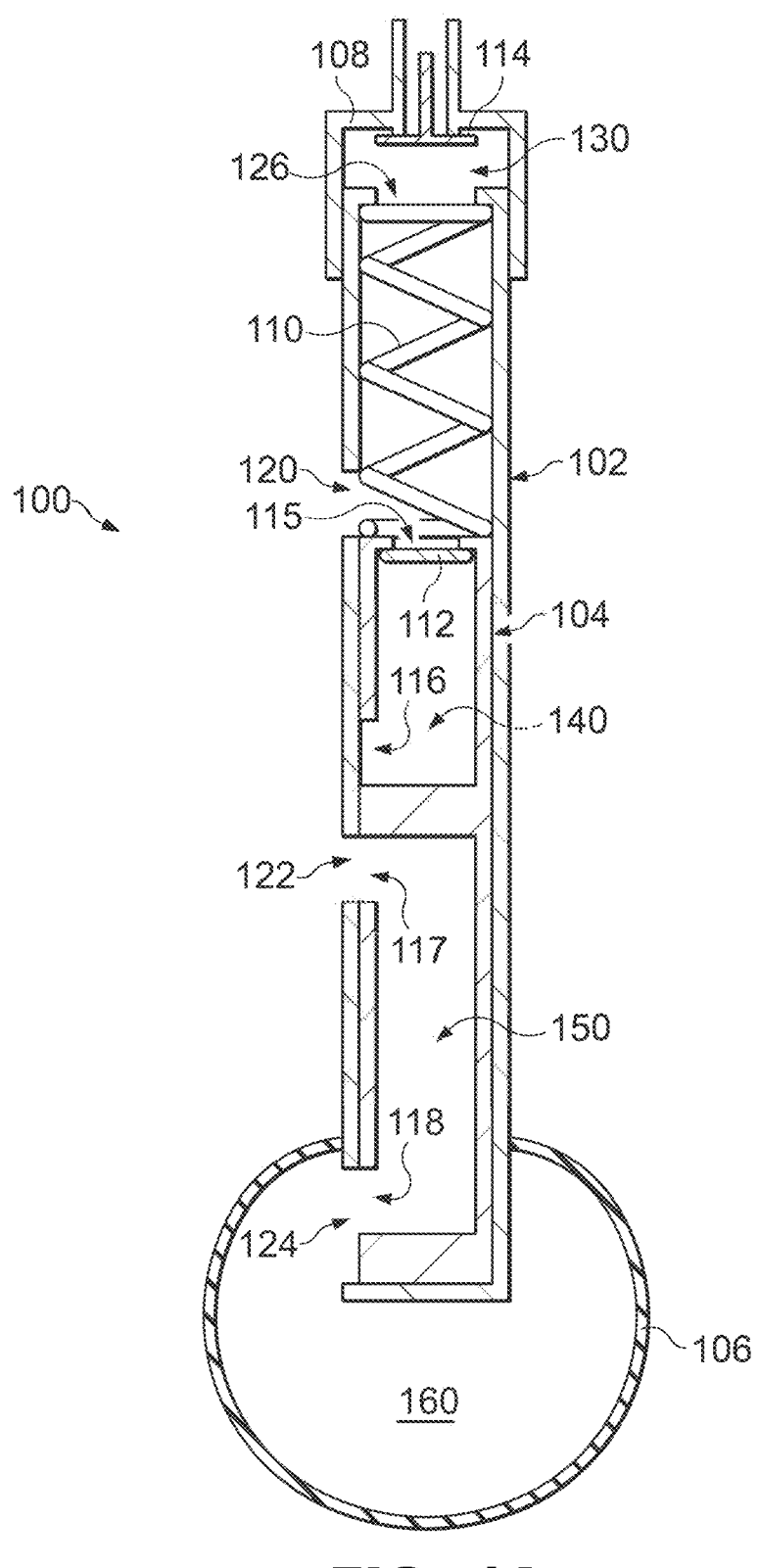
FIG. 1A is an illustration of a tire inflation apparatus at an initial manual tire inflation state according to an illustrative embodiment.

FIG. 1A is an illustration of a tire inflation apparatus 100 at a state of tire inflation (e.g., initial, manual tire inflation state). The apparatus can comprise a housing 102, a piston 104, a bladder 106, a cap 108, and a spring 110. The piston 104 is disposed within the housing 102. The cap 108 is attached to a first end of the housing 102. The bladder 106 is disposed at a second end of the housing 102 opposing the first end. The spring 110 is disposed within the housing 102 between a first end of the piston 104 and the first end of the housing 102. The tire inflation apparatus 100 is configured to inflate a tire as the tire rotates.

The tire inflation apparatus 100 can be configured to be embedded inside a wheel rim or tire to inflate the tire. The housing 102 may be sized to fit standardized valve stem holes sizes found in many passenger vehicle wheels and function as a valve stem for those wheels. In at least one example, the housing 102 is configured to fit inside a 0.453-inch diameter hole in a wheel. It is advantageous to use standardized valve stem sizing to promote simplified installation of the tire inflation apparatus 100 into other wheels without the need to create specialized wheels or tires for the apparatus 100 to function. However, larger or smaller-diameter hole configurations are applicable.

As depicted in the illustrative embodiment, the cap 108 can form a cap chamber 130 with the housing 102. The cap 130 may be configured to contain an air-intake valve 114 that is configured to allow air to enter into the cap chamber 130, but not to exit it. In at least one example, the air-intake valve 114 is a poppet valve. As explained further below (e.g., FIGS. 3A-3B), the cap 108 can be precisely attached to the housing 102 to create a desired volume of the cap chamber 130, allowing for configuration of the total volume of air inside the tire and the desired tire air pressure. In an alternative embodiment, the cap 108 is attached to the end of the housing 102 and does not have a cap volume. In such configurations, air flows through the cap 108 and into the housing chamber, which may be the volume in the housing 102 that the spring 110 occupies.

The housing 102 may contain a first aperture 120 in fluid connection with the cap chamber 130 when the piston 104 is positioned away from the first end of the housing 102, as shown in FIG. 1A. In this configuration, the cap chamber 130 may be bounded by the cap 108, the housing 102, and the piston 104. Air entering through the one-way valve 114 can exit the first aperture 120 by passing through a fourth aperture 126 of the housing 102. The spring 110 can be disposed within the housing 102 between the first end of the housing 102 and the piston 104. The spring 110 can be configured to be fully extended to allow for air to enter into a tire for an initial tire inflation after installing the apparatus 100 inside of a wheel.

As illustrated in the illustrative embodiment, the piston 104 may contain a first chamber 140 and a second chamber 150. The first piston chamber 140 may alternatively be referred to as a "piston chamber" in this disclosure. The first piston chamber 140 can be disposed within the piston 104 with at least one aperture 115 sealed by a one-way valve 112 and at least another aperture 116 sealed by a wall of the housing 102. The one-way valve 112 can be configured to separate the first piston chamber 140 and the housing chamber, only allowing air to enter into the first piston chamber 140 from the housing chamber, but not to exit it. The second piston chamber 150 may be similarly disposed within the piston 104 and can comprise a third aperture 117 and a fourth aperture 118. As shown in FIG. 1A, the second piston chamber 150 is in fluid connection with the tire chamber through a second aperture 122 of the housing 102 lining up with aperture 117 of the piston 104. Aperture 118 is in fluid connection with a bladder chamber 160 of the bladder 106 via a third aperture 124 of the housing. One or more of apertures 115-124 may comprise a screen (or filter) to prevent undesired materials from entering the tire chamber and/or bladder chamber 160 while allowing air to pass therethrough. The tire inflation apparatus 100 can further include one or more seals disposed between the side walls of the housing 102 and the piston 104. For example, the tire inflation apparatus 100 can include one or more O-rings disposed between the housing 102 and the piston 104. It is advantageous to include the one or more seals to prevent air from leaking out of compartments. For example, the one or more seals can prevent air from flowing along the side walls of the housing and disrupting the air pressure in the apparatus and the tire. In at least one example, an O-ring is positioned above the third aperture 124. In another example, an O-ring is positioned below the first aperture 120. In yet another example, an O-ring is positioned above the third aperture 124 and an O-ring is positioned below the first aperture 120.

One or more bladders 106 comprising one or more bladder chambers 160 (e.g., defined by the internal volume of the bladder) can be coupled to the second end of the housing 102. The one or more bladders 106 can be shaped or sized to fill the inside volume of the tire that the tire inflation apparatus 100 is designed to inflate. In some examples, the tire inflation apparatus can be crescent-shaped and can occupy the inner volume, or at least some portion, of the tire. For example, the one or more bladders 106 may occupy up to 90% of the inner volume of the tire. In at least one example, multiple bladders 106 could be disposed within the inner volume of the tire and optionally positioned equidistant to the other bladders 106.

After the tire inflation apparatus 100 is installed inside a wheel and sealed inside a tire, a user inflates the tire through the apparatus 100. Compressed air may initially be needed to inflate both the tire and the bladder 106. The position of the piston 104 in the initial manual inflation state (e.g., a first position) allows air to pass through the one-way valve 114, through the cap chamber 130, housing chamber, and into the tire chamber (see, e.g., 280 in FIG. 2). The compressed air cannot pass through the piston chamber 140 as it is bounded by a wall of the housing 102. Instead, the compressed air urges the piston 104 towards the second end of the housing 102 so that the housing chamber (and cap chamber 130) comes in fluid connection with the tire chamber via the first aperture 120. As air enters the tire chamber, air can also pass into the bladder chamber 160 of the bladder 106 via the second piston chamber 150. As the bladder inflates, air pressure builds inside the bladder chamber 160. The bladder 106 and the tire are both filled to the same initial air pressure. The tire inflation apparatus 100 may be configured such that after the initial manual tire inflation, the tire inflation apparatus 100 does not return to the initial manual inflation state because it will cycle between the second and third states.

Figure 1B:
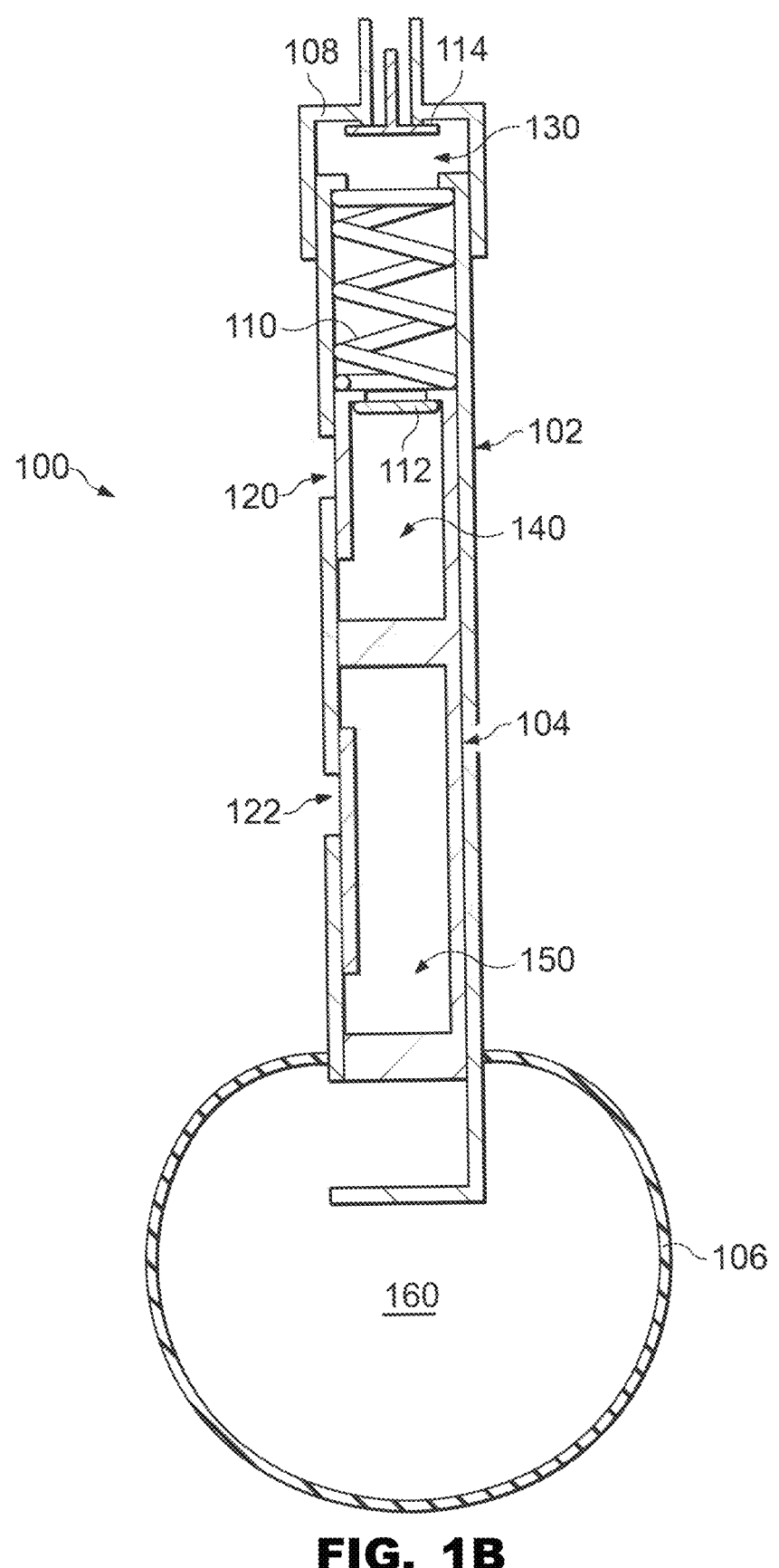
FIG. 1B is an illustration of a tire inflation apparatus at a second tire inflation state according to an illustrative embodiment.

With reference to FIG. 1B, an illustration of the tire inflation apparatus 100 at a second state of no air movement is depicted. The second state can be a steady state with no bladder 106 compression occurring. The spring 110 is also in an uncompressed position. Air pressure in the bladder chamber 160 and the housing chamber holds the piston 104 such that neither the housing chamber nor the first piston chamber 140 come into fluid connection with the tire chamber via the first aperture 120. Additionally, air in the tire chamber is prevented from fluidly connecting with air in the bladder chamber 160 via the second chamber 150. The second state may represent a time where the tire is not being inflated or deflated. The bladder chamber 160 is at the same air pressure as the tire chamber. No air flows into the tire at this state.

Figure 1C:
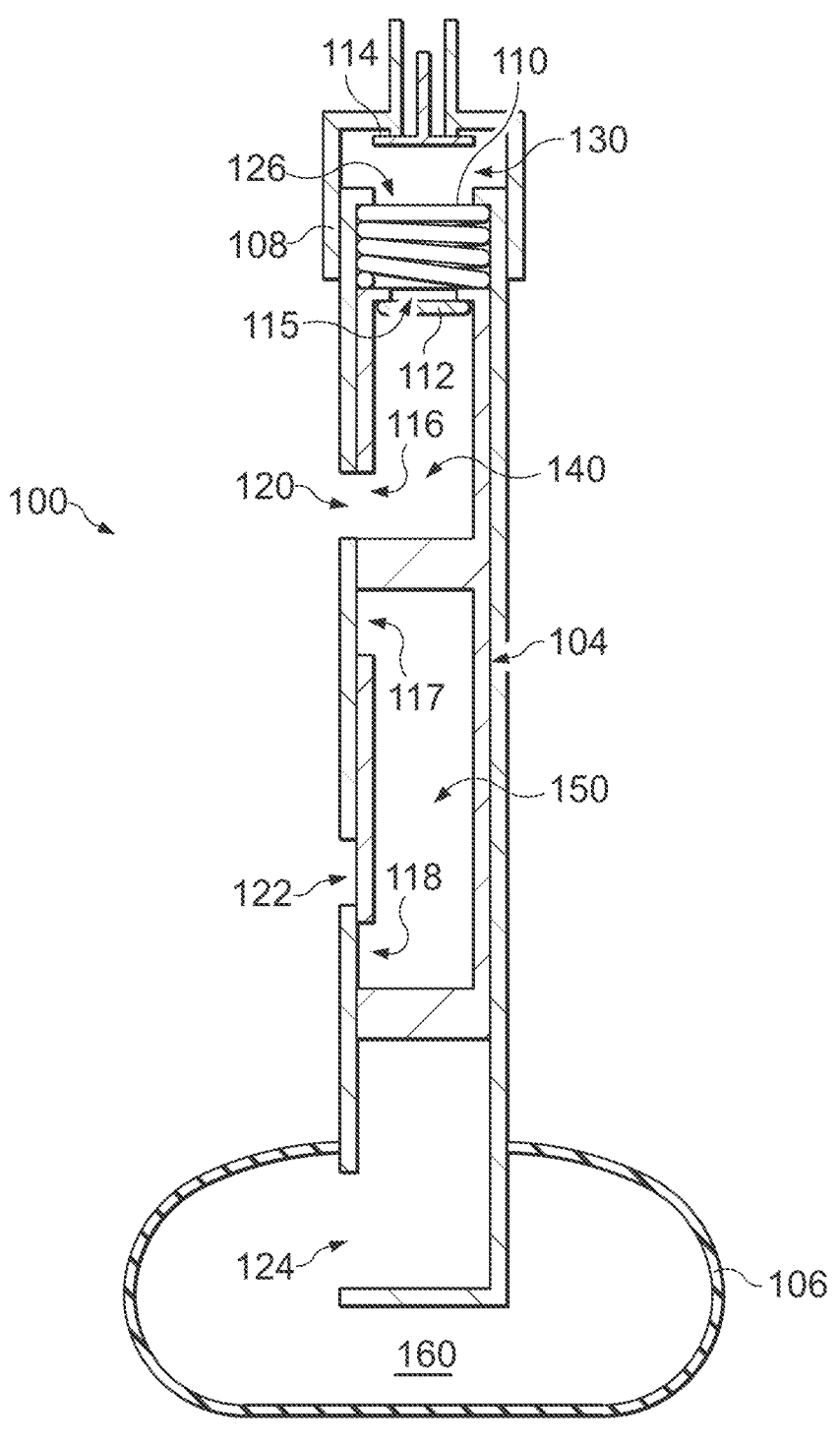
FIG. 1C is an illustration of a tire inflation apparatus at a third tire inflation state according to an illustrative embodiment.

Referring to FIG. 1C, an illustration of the tire inflation apparatus 100 at a third state of bladder compression is depicted. The third state may be a result of the tire deforming from lost air pressure. As the tire loses air pressure, the outward face of the tire deforms as the tire rotates at the point where the tire face contacts the surface. This deformation compresses the bladder 106, which can occupy up to 90% of the inner volume of the tire. As the bladder 106 compresses as a result of the deforming surface of the tire, air pressure in the bladder chamber 160 urges the piston 104 towards the first end of the housing 102. This compresses the spring 110. The air in the housing chamber (e.g., volume in the housing 102 occupied by the spring 110) is also compressed as a result of the smaller volume between the piston 104, the housing 102, and the cap 108. This compressed air results in higher air pressure in the housing chamber, which can ultimately exceed the air pressure in the tire chamber. After the air pressure of the housing chamber exceeds the air pressure in the tire chamber, the air in the housing chamber can pass through the one-way valve 112 of the first piston chamber 140 to enter into the tire chamber. Air tends to move from a higher-pressure area to a lower-pressure area and the one-way valve 112 allows for air to enter into the piston chamber 140, but not to exit it. Air will cease to move through the one-way valve 112 when an equilibrium exists between the first piston chamber 140, housing chamber, and the tire chamber.

Figure 2:
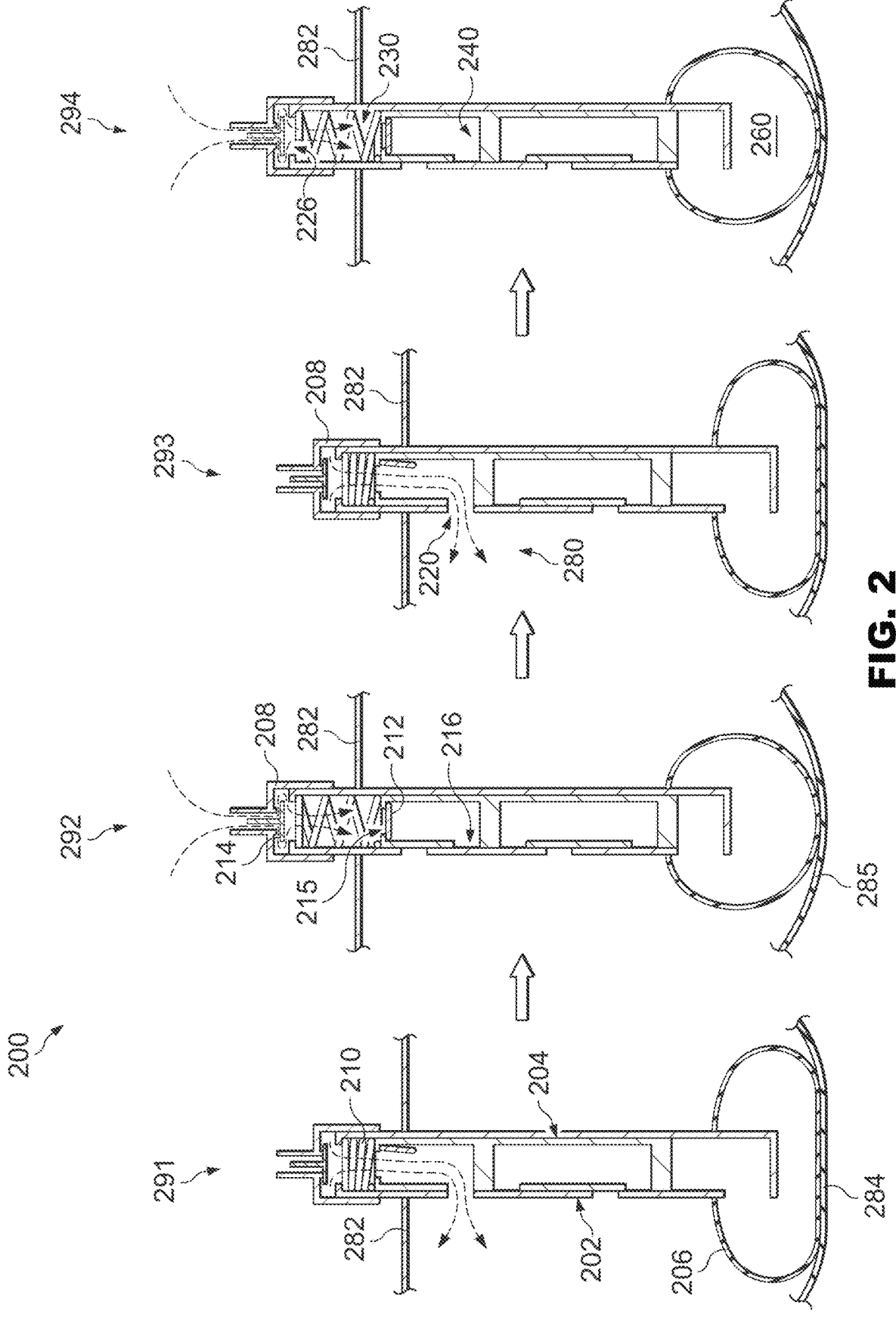
FIG. 2 is an illustrative diagram of a tire inflation apparatus inflating air into a tire according to an illustrative embodiment.

Turning to FIG. 2, an illustration of a cycle of a tire inflation apparatus 200 inflating a tire as it rotates at different points in time is depicted. The tire inflation apparatus 200 can comprise a housing 202, a piston 204, a bladder 206, a cap 208, and a spring 210. The piston 204 is disposed within the housing 202. The cap 208 is attached to a first end of the housing 202. The bladder 206 is disposed at a second end of the housing 202 opposing the first end. The spring 210 is disposed within the housing 202 between a first end of the piston 204 and the first end of the housing 202. The first end of the housing can have an aperture 226 causing a housing chamber 230 to form which is bounded by the cap 208, the housing 202, and a first end of the piston 204. The tire inflation apparatus 200 is embedded within a rim 282 of a wheel and is configured to inflate a tire as the tire rotates.

When the tire is low on air, as shown at time 291, a tire face compresses the bladder 206 as a result of deformation 284 from low tire pressure when the tire face contacts a surface as the tire rotates. The air forced out of the bladder chamber 260 urges the piston 204 towards the first end of the housing 202 compressing the air in the housing chamber 230. In another embodiment, the tire inflation apparatus 200 can be configured where the housing 202 does not have a lip at the first end. In such a configuration, the spring 210 (and piston 204) are retained within the housing 202 when the cap 208 is attached to the housing 202.

The tire inflation apparatus 200 may be configured such that the air pressure in the housing chamber 230, when compressed, reaches a pre-determined air pressure. For the tire inflation apparatus 200 to inflate a tire, the air pressure in the housing chamber 230 must exceed the air pressure in a tire chamber 280 for air to enter into the tire chamber 280, and thus inflating the tire. As explained below, the tire inflation apparatus 200 may be configured with an adjustable cap that is configured to adjust the set tire pressure to a desired pressure. After the air pressure in the housing chamber 230, exceeds the air pressure in the tire chamber 280, air passes through a one-way valve 212 in a first piston aperture 215 into a piston chamber 240 and into the tire chamber 280. This occurs because a second piston aperture 216 bounding the piston chamber 240 aligns with a first housing aperture 220 at time 291.

As air enters the tire chamber 280, the wheel continues to rotate. At time 292, the tire face with a corresponding bladder (e.g., the location of a bladder where the tire contacts the surface) no longer contacts the surface and is no longer deformed as a result of supporting the weight of the vehicle. The air pressure in the tire chamber 280 and the bladder chamber 260 pushes the tire surface outwards resulting in the bladder chamber 260 decompressing and a non-deformed tire shape 285. After the bladder 206 decompresses, the spring 210 decompresses which urges the piston 204 towards the second end of the housing 202. This movement seals off the tire chamber 280 from the piston chamber 240 and expands the volume of the housing chamber 230. As the volume of the housing chamber 230 expands, air is pulled from outside the tire into the housing chamber 230 through the one-way valve 214 of the cap 208. Thus, the housing chamber 230 fills with air until it reaches the same air pressure as the air outside the tire. When the tire completes a rotation, at time 293, the tire face once again contacts the surface and deforms (at a bladder location) as a result of the weight of the vehicle bearing down on it. This compresses the air in the bladder chamber 260 and forces the piston towards the first end of the housing 202, which ultimately results in compressed air flowing into the tire chamber 280.

Furthermore, the tire continues to rotate at time 294 causing the spring to decompress which seals the air inside the tire chamber 280 and pulling air from outside the tire into the housing chamber 230. This cycle repeats itself as the air pressure displaces the piston 204 along the length of the housing 202 as the bladder 206 deforms.

As previously described in FIG. 2, after the tire is inflated at time 291, the tire inflation apparatus 200 may begin to cycle between a steady state 292, 294 and a bladder compression state 293. The volume of the housing chamber varies between these states, becoming smaller during the bladder compression state 293 and larger during the steady state 292, 294. Accordingly, the pressure in the housing chamber varies as the volume changes. Once the chamber volume has a lower pressure than the ambient pressure (e.g., 14.7 psi) and creates a pressure differential with the outside, air from the outside will flow through the one-way valve in the cap into the housing chamber. As the pressure differential becomes larger, the faster air flows into the housing chamber
to inflate the tire. The following mathematical equation may
be used to calculate the chamber pressure when the piston is
located at various positions within the housing:

$$P_{Total} = P_{Tire} + P_{A,bient}$$

$$P_{Ch\_X} = P_{Ch\_1} \times \frac{(V_{Ch\_1} + V_{cap})}{(V_{Ch\_x} + V_{cap})}$$

where $P_{Tire}$ represents the set tire pressure, $P_{Ambient}$ repre-
sents the ambient pressure outside the air inflation apparatus
200, and $P_{Total}$ represents the sum of the $P_{Tire}$ and $P_{Ambient}$.
$V_{Ch\_1}$ represents the volume of the housing chamber while
the piston 204 compresses the spring 210, representing the
volume at position 1 of the housing chamber (e.g., minimum
volume). For example, at position 1, the piston 204 is
positioned closest to the top of the housing 202. $V_{Cap}$
represents the volume of the cap 208. $V_{Ch\_x}$ represents the
volume of the housing chamber 230 when the piston 204 is
in any position along the length of the housing. $P_{Ch\_1}$
represents the pressure of the housing chamber at position 1
(representing maximum pressure at $V_{Ch\_1}$) and $P_{Ch\_x}$ rep-
resents the pressure of the housing chamber at $V_{Ch\_x}$ (e.g.,
any position of the piston along the housing chamber).

The size of the tire inflation apparatus 200 (e.g., piston,
cap, and housing dimensions) may be approximated based
on the desired tire pressure ($P_{Tire}$). As explained above, the
tire inflation apparatus 200 should be sized such that the
pressure of the housing chamber will be lower than the
ambient pressure (14.7 psi) for at least one position of the
piston within the housing (i.e., somewhere between mini-
mum and maximum spring compression). By way of
example, the typical tire pressure for a car is between 30 and
35 psi. Accordingly, as illustrated below in Table 1, for a tire
inflation apparatus 200 having a $V_{Cap}$ of zero, a tire inflation
apparatus 200 having a housing chamber volume of about
3.5-4 volumetric units would create a sufficient pressure
differential to induce ambient air to enter the housing
chamber 230. As further explained below, the volumetric
ratio ($V_R$) is the ratio of the maximum volume of the housing
chamber to the minimum volume of the housing chamber.
Accordingly, the volumetric units (e.g., mL, in³, etc.) will
depend on the selected sizing of the tire inflation apparatus
200 and the corresponding $V_R$. Specifically, for a tire pres-
sure of 30 psi, the tire inflation apparatus 200 would inflate
the tire at least as early as the volume reaching 3.5 volu-
metric units and inflate at a faster rate upon reaching 4
volumetric units. The dimensions may be altered to increase
the maximum housing chamber volume, thereby increasing
the pressured differential and tire inflation rate.

apparatus 300 can comprise a housing 302, a piston 304, a
bladder 306, an adjustable cap 308, and a spring (not
illustrated). The housing 302 may be configured to affix to
the rim. The piston 304 is disposed within the housing 302
and may be configured such that the piston can be removed
from the housing 302 when the cap 308 is removed from the
housing 302. The piston 304 can include a first piston
chamber 316A and a second piston chamber 316B. The
adjustable cap 308 is attached to a first end of the housing
302. The adjustable cap 308 may comprise a first portion
308A and a second portion 308B, with the first portion 308A
being removably coupled to the housing 302 and the second
portion 308B being removably coupled to the first portion
308A. The first portion 308A may be configured to prevent
removal of the piston while the first portion 308A is attached
to the housing 302. In the illustrative embodiment, a portion
of the surface of the first end of the housing 302 and an inner
surface of the first portion 308A of the adjustable cap 308
comprise threaded interfaces 311 that are configured to
engage the first portion 308A of the adjustable cap 308 with
the housing 302. The second portion 308B of the adjustable
cap 308 and an inner surface of the first portion 308A of the
adjustable cap 308 comprise threaded interfaces 309 that are
configured to engage the first portion 308A of the adjustable
cap 308 with the second portion 308B of the adjustable cap
308. The second portion 308B of the adjustable cap 308 may
also include a one-way valve 313. The bladder 306 is
disposed at a second end of the housing 302 opposing the
first end. The spring (not illustrated) is disposed within the
housing 302 between a first end of the piston 304 and the
first end of the housing 302. Although the tire inflation
apparatus 300 depicted in the illustrative embodiment is not
shown implemented in a tire, it is understood that the
bladder 306 in FIGS. 3C and 3D would be compressed to
urge the piston into the depicted positions (see, e.g., FIG. 2
at 293).

Figures 3A, 3B, 3C, 3D:
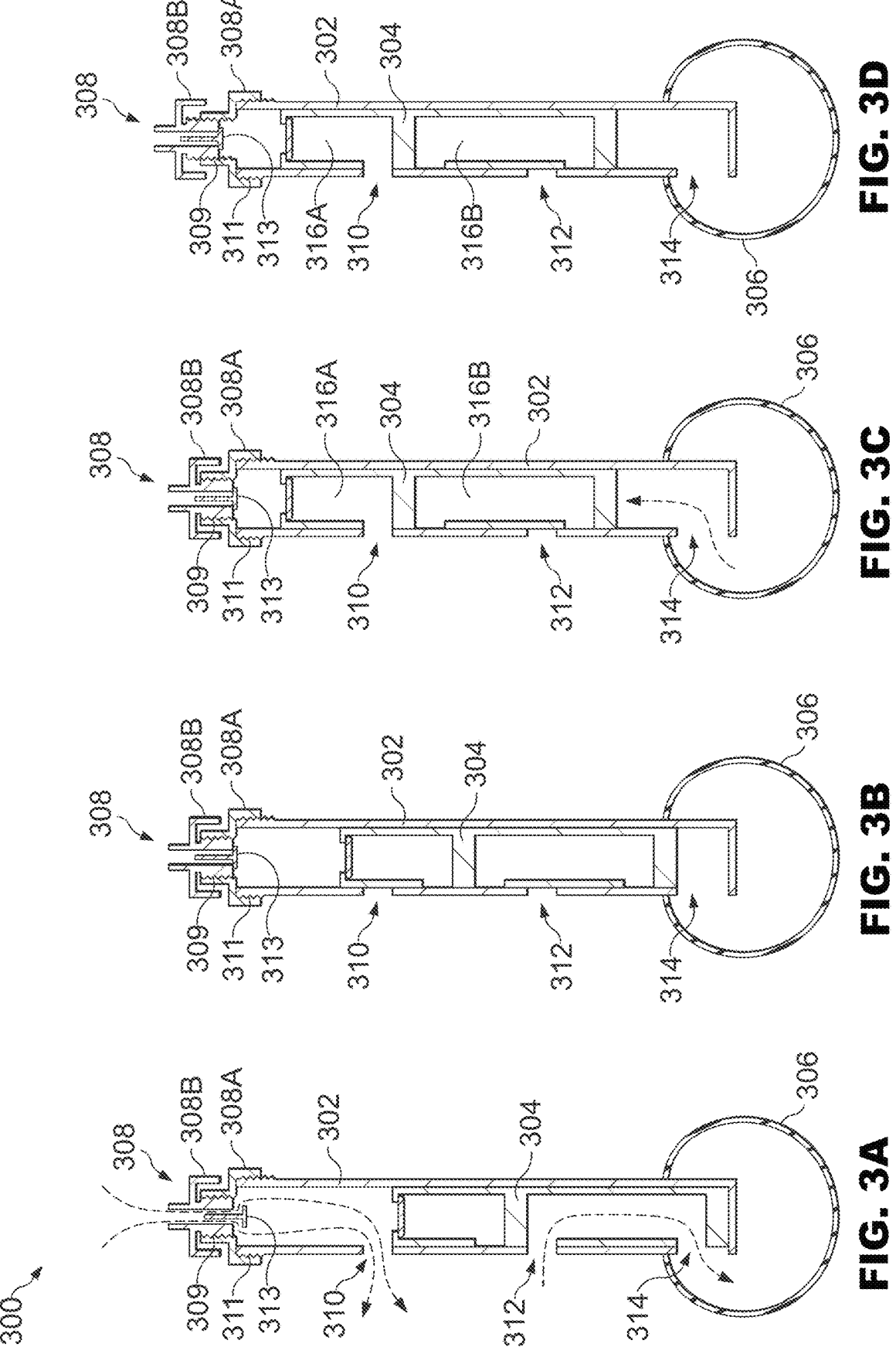
FIG. 3A is an illustrative diagram of a tire inflation apparatus with an adjustable cap in a tire inflation configuration according to an illustrative embodiment.
FIG. 3B is an illustrative diagram of a tire inflation apparatus with an adjustable cap in a steady-state configuration according to an illustrative embodiment.
FIG. 3C is an illustrative diagram of a tire inflation apparatus with an adjustable cap in a compressed configuration according to an illustrative embodiment.
FIG. 3D is an illustrative diagram of a tire inflation apparatus with an adjustable cap in an increased volume configuration according to an illustrative embodiment.

When the tire inflation apparatus 300 is in a configuration
where it is being manually inflated (e.g., the initial manual
inflation of the tire), the first aperture 310 of the housing 302
may be configured to be in fluid connection with the housing
chamber, the second aperture 312 of the housing 302 may
configured to be in direct fluid connection with the second
piston chamber, and the third aperture 314 of the housing
302 may configured to be in direct fluid communication with
the interior of the bladder 306, as shown in FIG. 3A.
Accordingly, in the manual tire inflation configuration, air is
able to pass through the one-way valve 313 of the adjustable
cap 308 and inflate the tire via the first aperture 310. Air is
also able to inflate the bladder 306 by passing through the
second aperture 312, the second piston chamber, and third
aperture 314. Upon inflating the tire to a desired pressure,

TABLE 1

| | | | | [$V_{ch\_1}$ = 1 volumetric unit; $V_{Cap}$ = 0] | | | | |
|---|---|---|---|---|---|---|---|---|
| $P_{Tire}$ (psi) | $P_{Total}$ (psi) | $P_{ch\_1}$ (psi) | $P_{ch\_1.5}$ (psi) | $P_{ch\_2}$ (psi) | $P_{ch\_2.5}$ (psi) | $P_{ch\_3}$ (psi) | $P_{ch\_3.5}$ (psi) | $P_{ch\_4}$ (psi) |
| 20 | 34.7 | 34.7 | 23.1 | 17.4 | 13.9 | 11.6 | 9.9 | 8.7 |
| 25 | 39.7 | 39.7 | 26.5 | 19.9 | 15.9 | 13.2 | 11.3 | 9.9 |
| 30 | 44.7 | 44.7 | 29.8 | 22.4 | 17.9 | 14.9 | 12.8 | 11.2 |
| 35 | 49.7 | 49.7 | 33.1 | 24.9 | 19.9 | 16.6 | 14.2 | 12.4 |
| 40 | 54.7 | 54.7 | 36.5 | 27.4 | 21.9 | 18.2 | 15.6 | 13.7 |

With reference to FIGS. 3A-3D, a tire inflation apparatus
300 in various configurations is illustrated. The tire inflation the tire inflation apparatus 300 is in a steady-state configu-
ration, as shown in FIG. 3B. In the steady-state configuration the pressure from the bladder 306 positions the piston 304 such that the first aperture 310 and the second aperture 312 are closed. When the tire begins to lose air pressure, higher pressure differential between the housing chamber and the ambient air induce air into the housing chamber and into the tire, forcing the piston 304 into a position such that the first aperture 310 is in fluid communication with the first piston chamber 316A, as illustrated in FIG. 3C. The adjustable cap 308 may be used to adjust the tire pressure by increasing or decreasing the volume of the adjustable cap 308. For example, as illustrated in FIG. 3D, the second portion 308B of the adjustable cap 308 may be unscrewed, thereby increasing the volume of the adjustable cap 308 ("cap volume, V$_{Cap}$"). As the cap volume increases, the set tire pressure decreases. The following mathematical equation may be used to calculate the set tire pressure when the adjustable cap 308 has various volume sizes:

$$V_R = \frac{V_{Ch\_2}}{V_{Ch\_1}}$$

$$P_{Tire\_Max} = \frac{(V_{Ch\_1} \times V_R + V_{cap}) \times P_{Ch\_2}}{V_{Ch\_1} + V_{cap}}$$

where V$_R$ represents the housing chamber volume ratio, V$_{Ch\_2}$ represents the maximum housing chamber volume, and V$_{Ch\_1}$ represents the minimum housing chamber volume. P$_{Tire\_Max}$ represents the maximum tire pressure at a given V$_R$, V$_{Cap}$ represents the volume of the adjustable cap 308, and P$_{Ch\_2}$ represents the pressure of the housing chamber at V$_{Ch\_2}$.

As illustrated below in Table 2, increasing the volume of V$_{Ch\_1}$ (e.g., the minimum housing chamber volume) increases the sensitivity of the adjustments to the cap volume (depicted in volumetric units). Accordingly, a tire inflation apparatus with a larger V$_{Ch\_1}$ will enable a user to select smaller incremental pressures. While Table 2 reflects an air inflation apparatus configured with a V$_R$ of 4, it is understood that this is an example, and the volume ratio of the tire inflation apparatus may be varied according to user needs.

TABLE 2

| V$_{Cap}$ | P$_{Tire\_Max}$(psi) $\left[V_R = \frac{4}{1}\right]$ | P$_{Tire\_Max}$(psi) $\left[V_R = \frac{6}{1.5}\right]$ | P$_{Tire\_Max}$(psi) $\left[V_R = \frac{8}{2}\right]$ |
|---|---|---|---|
| 0.0 | 40.1 | 40.1 | 40.1 |
| 0.1 | 36.4 | 37.5 | 38.1 |
| 0.2 | 33.3 | 35.3 | 36.4 |
| 0.3 | 30.6 | 33.3 | 34.7 |
| 0.4 | 28.4 | 31.4 | 33.3 |
| 0.5 | 26.4 | 29.8 | 31.9 |
| 0.6 | 24.7 | 28.4 | 30.6 |
| 0.7 | 23.2 | 27.0 | 29.4 |

As previously noted herein, the tire inflation apparatus (100, 200, 300) disclosed herein may be sized and configured to install in existing tires. For example, typical vehicle valve stems are designed to fit either 0.453-inch or 0.625-inch diameter holes in the wheel rim. Passenger vehicle valve stems come in different lengths, ranging from about 0.88 inches to about 2.00 inches, and may be rated for pressures of up to 65 pounds per square inch (PSI). Other types of wheels also use standardized sizes for valve stems. For example, many bicycle wheels use the same 0.453 inch (⁵⁄₁₆") "Schrader" hole diameter often found in cars and motorcycles. Other bicycle wheels use a 7 mm "Presta" or an 8 mm "Dunlop" hole diameter. Accordingly, the tire inflation apparatus (100, 200, 300) disclosed herein may be sized according to these valve stem specification or any other valve stem specifications known in the art. Additionally, the hole sizes may be altered to accommodate various configurations.

Figure 4:
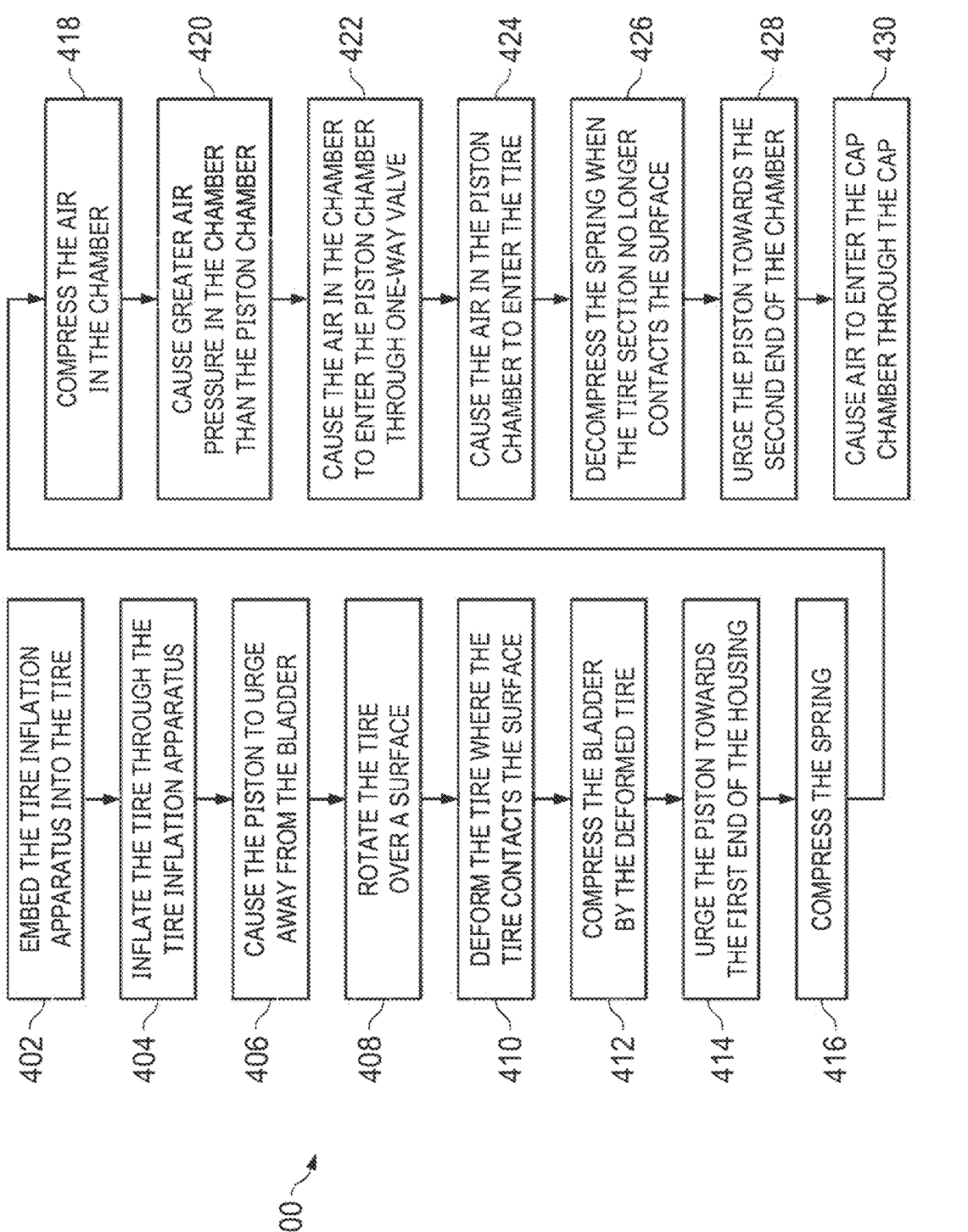
FIG. 4 illustrates a flow chart of a method for inflating a tire according to an illustrative embodiment.
Figures 5, 6:
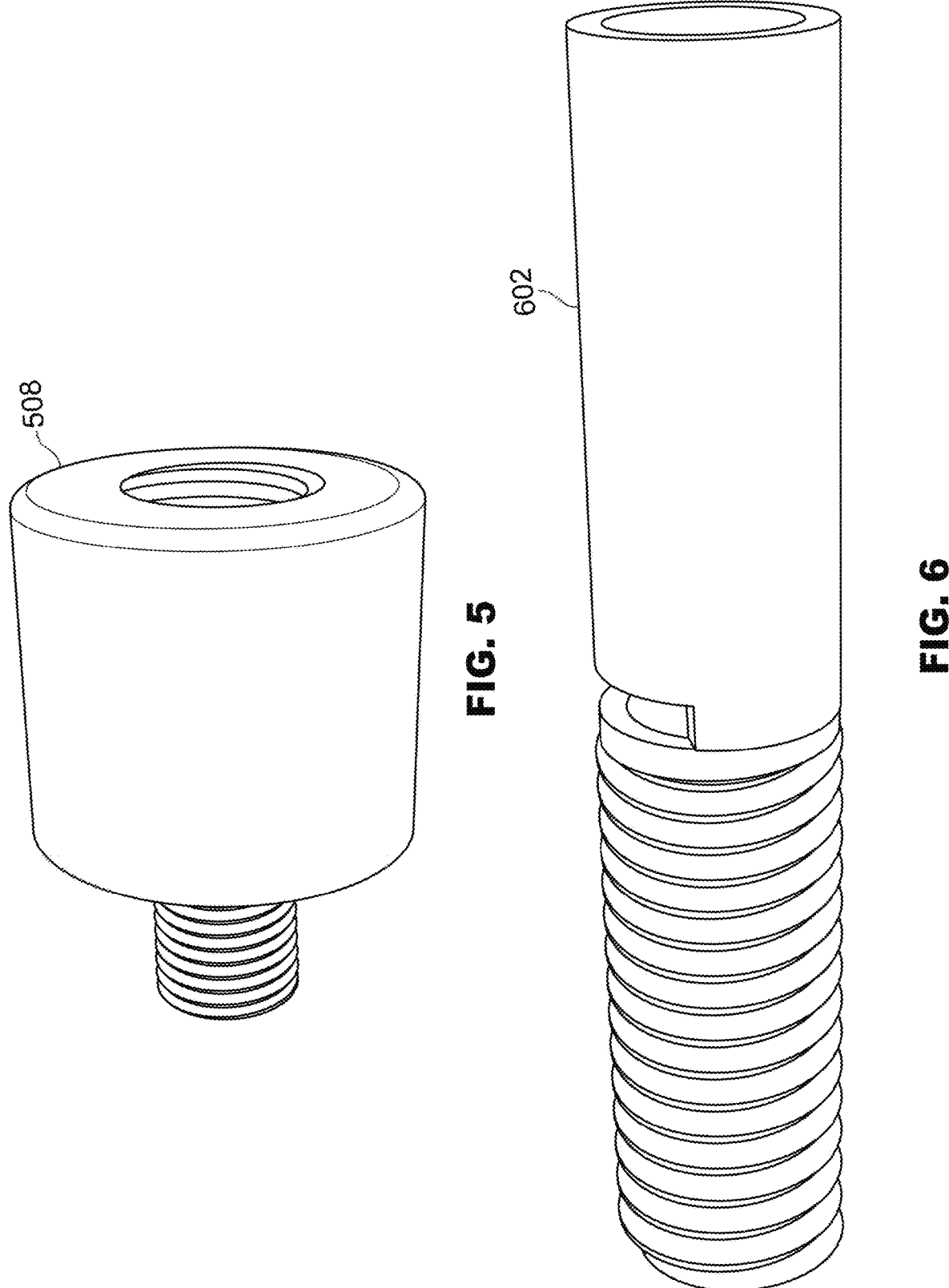
FIG. 5 illustrates a cap in accordance with various embodiments of this disclosure.
FIG. 6 illustrates a housing in accordance with various embodiments of this disclosure.
Figure 7:
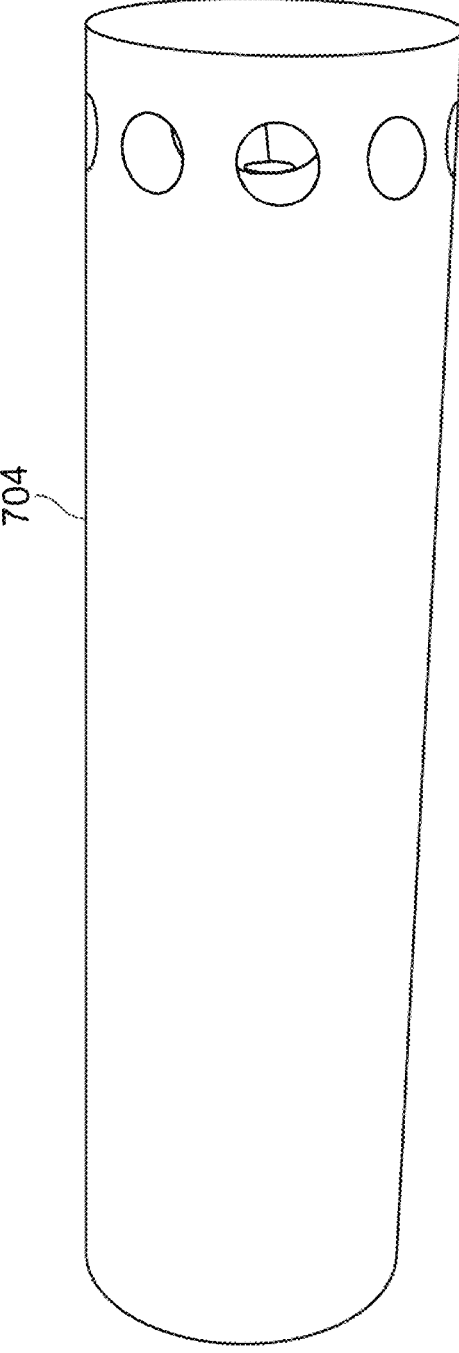
FIG. 7 illustrates a piston in accordance with various embodiments of this disclosure.
Figures 8A, 8B, 8C, 8D:
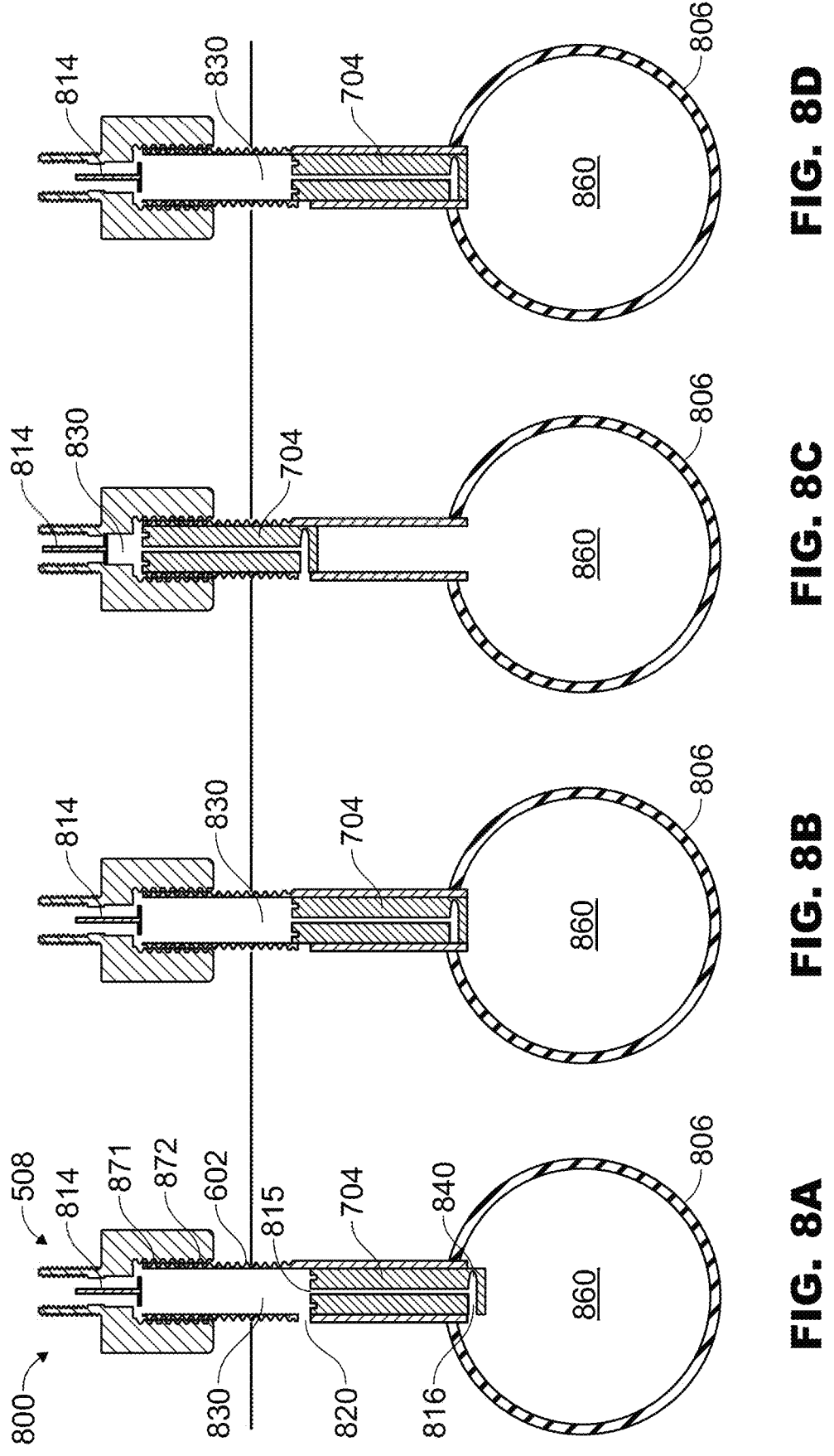
FIG. 8A is an illustration of a tire inflation apparatus having a valveless piston at a first tire inflation state according to an illustrative embodiment.
FIG. 8B is an illustration of a tire inflation apparatus having a valveless piston at a second tire inflation state according to an illustrative embodiment.
FIG. 8C is an illustration of a tire inflation apparatus having a valveless piston at a third tire inflation state according to an illustrative embodiment.
FIG. 8D is an illustration of a tire inflation apparatus having a valveless piston at a fourth tire inflation state according to an illustrative embodiment.

FIG. 4 is an illustration of a flow chart 400 of a method for maintaining air pressure in a tire using a tire inflation apparatus (such as the apparatus 100, 200, and/or 300) is shown in FIGS. 1-3. The tire apparatus can comprise a main housing, a cap, a piston, a spring, and a bladder. The first end of the housing may protrude outside the tire, wheel, or rim. The cap may be attached to the first end of the housing. The cap can be configured to allow external air to enter into the cap, but not exit (e.g., via a one-way valve). The piston can be disposed within the housing and can comprise a piston chamber and a one-way valve. The spring can be disposed within the housing between a first end of the piston and the first end of the housing. The bladder can be attached at a second end opposing the first end of the housing, forming a bladder chamber with the second end of the housing. The cap (e.g., 308 in FIG. 3A) and the first end of the housing may define a cap chamber. The piston may be configured to urge towards the first end of the housing when the bladder chamber is compressed, thereby compressing the spring. The air may flow from the housing chamber into the first piston chamber via the one-way valve in the piston. The spring may also be configured to urge the piston towards the second end of the housing when the bladder is no longer compressed.

The method 400 may begin with step 402, where the tire inflation apparatus is embedded into the tire. This can involve embedding the tire inflation apparatus into the rim of a wheel. In some embodiments, the tire inflation apparatus replaces a tire valve stem. At step 404, the tire may be initially inflated through compressed air passing through the tire inflation apparatus. In step 406, the piston may be positioned away from the bladder, thereby sealing the air in the bladder from being in fluid communication with other chambers.

In step 408, the tire rotates over a surface, thereby deforming the tire in step 410 when the tire contacts the surface and contains insufficient air pressure. In step 412, the bladder is compressed by the deformed tire, thereby urging the piston towards the first end of the housing in step 414. The spring is compressed in step 416 and the air in the housing chamber is compressed in step 418, causing air pressure in the cap chamber to be greater than the air in the piston chamber in step 420. At step 422, air in the cap chamber is caused to enter the piston chamber through the one-way valve and air in the piston chamber is caused to enter the tire chamber in step 424.

In step 426, the spring decompresses when the bladder is no longer compressed. For example, this may occur when a section of the tire corresponding to the bladder is no longer contacting the surface (e.g., road or pavement), and/or when sufficient air has been forced into the tire. The piston is placed towards the second end of the housing chamber in step 428 and air is caused to enter the cap chamber through the cap in step 430. Optionally, at any of the preceding steps, the volume of the cap may be adjusted to increase or decrease the desired pressure of the tire. This process (e.g., steps 408-430) may continue to repeat itself as necessary when the tire pressure is insufficient.

Further embodiments of this disclosure are depicted in FIGS. 5-8. Tire inflation apparatus 800, which generally resembles tire inflation apparatus 100, can comprise a cap 508, a housing 602, and piston 704. Such embodiments may include other components previously discussed in reference to FIGS. 1-3 though not depicted in FIGS. 5-8.

A cap 508 may include an interior threaded section 871 that is configured to engage with an exterior threaded section 872 of housing 602. Housing 602 may have a first end having a first aperture and a second end disposed substantially opposite the first end relative the length of housing 602. The first and second ends may partially define an interior housing volume. Housing 602 may also have a third aperture 820 disposed in a side wall between the first and second ends.

A piston 704 may be configured with a first piston aperture 815, at least one second piston aperture 816, and a piston chamber 840 disposed therebetween. Shown in FIG. 8, tire inflation apparatus 800 is situated and functions similarly to tire apparatus 100. Tire inflation apparatus 800 is shown in phases of tire and bladder filling (8A), air intake (8B and 8D), and air compression into a tire (8C). This design permits a valveless piston while still utilizing intake valve 814 similar to intake valve 114 in tire inflation apparatus 100.

Yet further embodiments of a tire inflation apparatus are depicted in FIGS. 9-12. These embodiments feature an alternative piston and housing configuration while accommodating adjustable pressure settings as will be further described below. A tire inflation apparatus in accordance with these further embodiments may generally be situated and function similarly to tire apparatus 100 and 800. FIG. 11 illustrates a tire inflation apparatus in accordance with such further embodiments in a compressed state (11A), at the bottom of stroke (11B), and in a compressed state with an open valve to provide pressure relief (11C).

Figure 12:
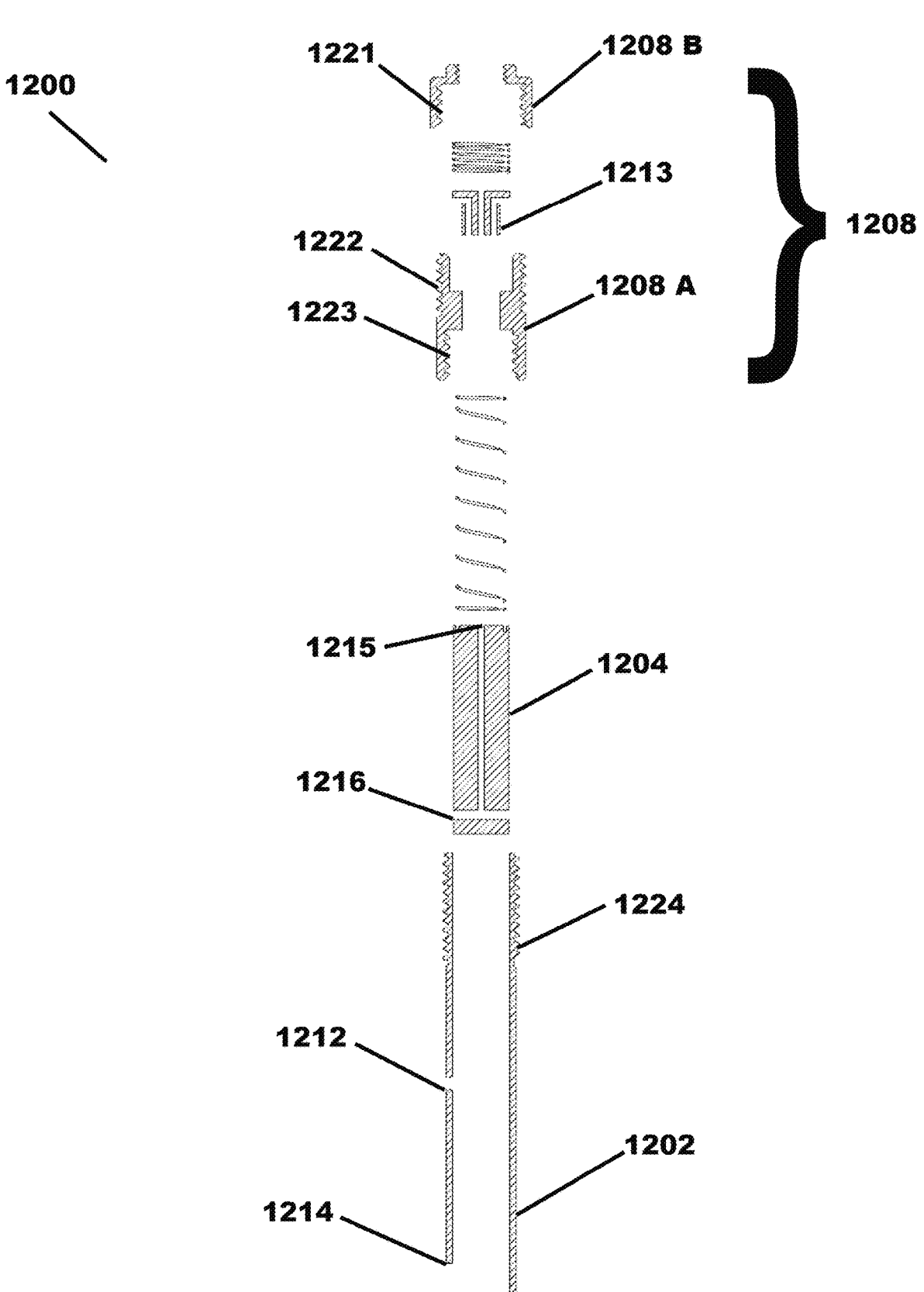
FIG. 12 is an exploded view of a tire inflation apparatus having a pressure adjuster.

FIG. 12 depicts an exploded view of a tire inflation apparatus 1200. Tire inflation apparatus 1200 facilitates the setting of a desired tire pressure and the accommodation of two-way air flow. The apparatus can comprise a housing 1202, a piston 1204, a bladder (not depicted but similarly situated to those in other described embodiments), and a cap 1208. The piston 1204 is disposed within the housing 1202. The cap 1208 is attached to a first end of the housing 1202. The bladder is disposed at a second end of the housing 1202 opposing the first end. A first spring is disposed within the housing 1202 between a first end of the piston 1204 and the first cap portion 1208A of cap 1208. The tire inflation apparatus 1200 is configured to inflate a tire as the tire rotates.

As depicted in the illustrative embodiment, the cap 1208 may be engaged (reversibly or permanently) with housing 1202. Such engagement may be made, for example, via an external threaded portion 1224 of housing 1202 and an internal threaded portion 1223 of first cap portion 1208A. The first cap portion 1208A may be configured to contain a valve 1213 that is configured to allow air to pass through first cap portion 1208A into the housing 1202 and vice versa depending, at least in part, on the relative proximal air pressures or operation of any biasing mechanisms. For example, air may pass into a volume at least partially defined by second cap portion 1208B, valve 1213, and first cap portion 1208A from housing 1202 during the compression stroke of piston 1204 when the piston compression pressure exceeds the force of some opposing biasing mechanism, such as a spring as described further below. A second cap portion 1208B may be reversibly engaged with the first cap portion 1208A via an external threaded portion 1222 or first cap portion 1208A and an internal threaded portion of second cap portion 1208B. A second spring may be disposed between the second cap portion 1208B and the first cap portion 1208A such that the degree of engagement between the second cap portion 1208B and first cap portion 1208A defines, at least in part, a pressure level required to cause actuation of valve 1213. In various embodiments, cap portion 1208B may be rotated clockwise or counter-clockwise to set a desired target tire pressure. Cap portion 1208B may be rotated clockwise to set a higher target pressure accomplished by compressing a cap spring (located between 1208A and 1208B and against valve 1213) and thereby exerting greater force which opposes the pressure caused by the piston during the compression cycle. Likewise, rotating 1208B counter-clockwise, relieves the pressure exerted by the cap spring.

Figures 11A, 11B, 11C:
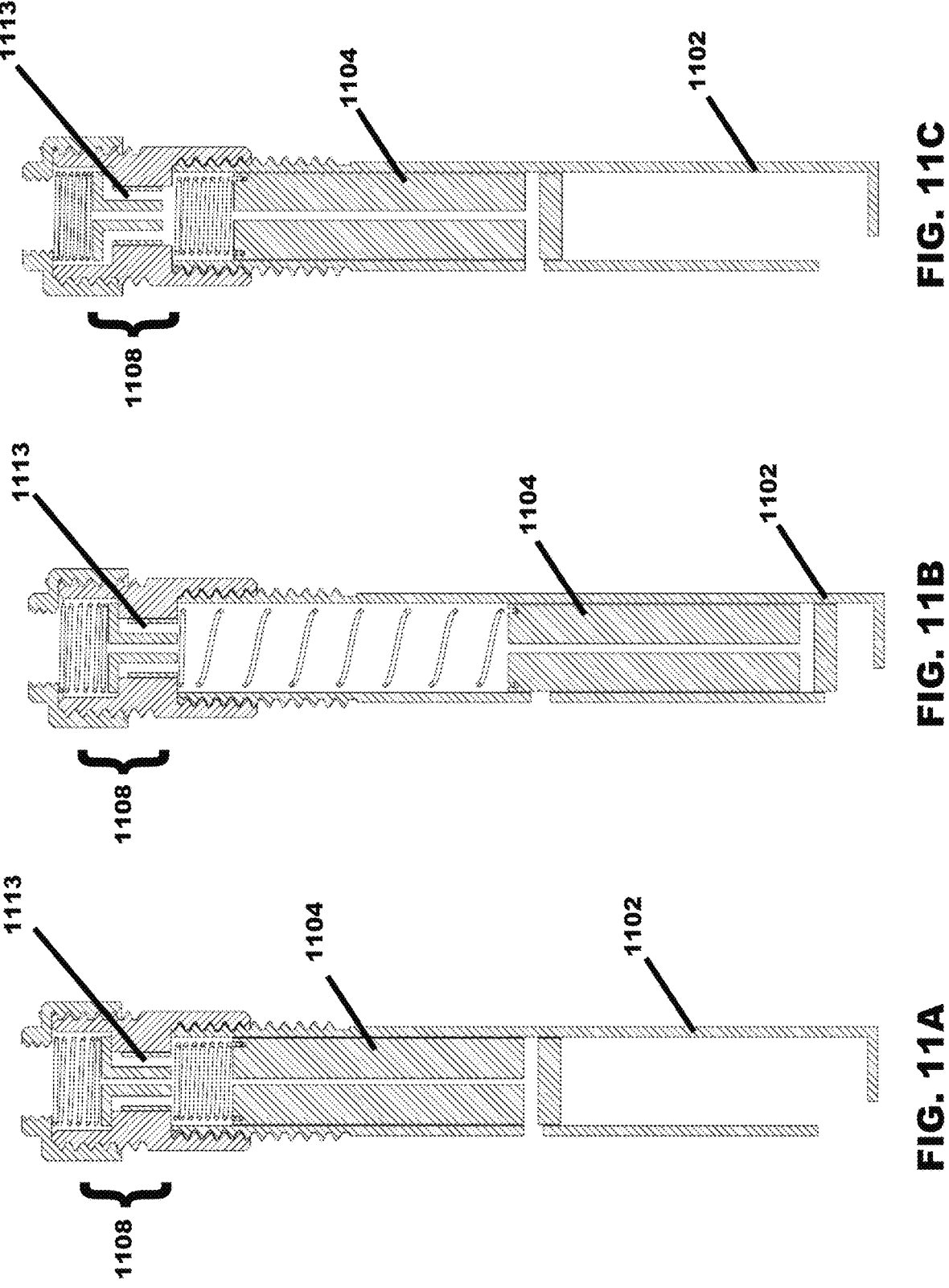
FIG. 11A is an illustration of a tire inflation apparatus having a pressure adjuster at a first tire inflation state according to an illustrative embodiment.
FIG. 11B is an illustration of a tire inflation apparatus having a pressure adjuster at a second tire inflation state according to an illustrative embodiment.
FIG. 11C is an illustration of a tire inflation apparatus having a pressure adjuster at a third tire inflation state according to an illustrative embodiment.

Valve 1213 may have one inlet 1213i configured to permit airflow into housing 1202 from cap 1208 and to prevent airflow in the opposite direction from housing 1202 into cap 1208. Such configuration may be realized through inclusion of a one-way valve at the end of the inlet nearest housing 1202. Further, the one inlet may be disposed between one or more outlets 1213o configured to permit airflow from housing 1202 into cap 1208 when the one or more outlets are actuated by operation of piston 1204 as depicted in FIG. 11C.

The housing 1202 may contain a first housing aperture 1212 in fluid connection with an interior tire volume. The housing 1202 may further contain a second housing aperture 1214 in fluid connection with the bladder. The piston 1204 may be caused to move within the housing 1202 by, at least in part, variations in air pressure within the interior tire volume, the bladder, as applied by an external source through cap 1208, operation of any biasing mechanisms, or some combination thereof. For example, piston 1204 may be urged upward to the first end of the housing by compression of the bladder (as occurs during a compression cycle) and may be generally biased downward toward a second end by a spring positioned between cap portion 1208A and piston 1204.

The piston 1204 has a passageway disposed therein that runs through a length of piston 1204 and is configured to allow air to flow from a first piston aperture 1215 and a second piston aperture 1216 and vice versa. The second piston aperture 1216 is configured to permit fluid communication with first housing aperture 1212 and second housing aperture 1214 depending on the position of the piston 1204 within the housing 1202. Fluid communication with these housing apertures facilitates manual inflation.

The section headings herein are provided for consistency with the suggestions under 37 C.F.R. § 1.77 or to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that particular technology is prior art to any embodiment(s) in this disclosure. Neither is the "Summary" a characterization of the embodiment(s) outlined in issued claims.

Furthermore, any reference in this disclosure to "invention" in the singular should not be used to argue that there is only a single point of novelty in this disclosure. Multiple embodiments may be set forth according to the limitations of the multiple claims issuing from this disclosure. Such claims accordingly define the embodiment(s) and their equivalents that are protected thereby. In all instances, the scope of such claims shall be considered on their own merits in light of this disclosure but should not be constrained by the headings set forth herein.

Moreover, the Abstract is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the preceding Detailed Description, it can be seen that various features may be grouped in a single embodiment to streamline the disclosure. This method of disclosure is not to be interpreted as reflecting an intention that the claimed embodiments require more features than are expressly recited in each claim. Instead, as the claims reflect, the inventive subject matter lies in less than all features of a single disclosed embodiment. Thus, the following claims are incorporated into the Detailed Description, with each claim standing on its own as a separate embodiment.

What is claimed is:

1. A tire inflation apparatus comprising:
a housing, wherein the housing comprises a first end and a second end;
a piston disposed within the housing, the piston comprising a plurality of piston apertures, wherein the plurality of piston apertures are in fluid communication with each other;
a piston spring disposed within a housing chamber in the housing, wherein a volume between a first end of the piston and the first end of the housing partially defines the housing chamber, and wherein the spring is configured to bias the piston along a length of the housing;
a housing cap configured for engagement with the first end of the housing, wherein the housing cap comprises a cap body and a valve, the valve comprising at least one air inlet configured to permit fluid communication between the cap and the housing chamber in a first direction, the valve further comprising at least one air outlet configured to permit fluid communication between the cap and the housing chamber in a second direction; and
a bladder coupled to the second end of the housing, the second end opposing the first end, wherein a volume of the bladder is configured to permit fluid communication with the piston.

2. The tire inflation apparatus of claim 1, wherein:
the cap body comprises a pressure cap and a housing connector, wherein the pressure cap has a cap internal threaded section configured for engagement with a housing connector external threaded section of the housing connector, wherein the housing connector has a housing connector internal threaded section configured for engagement with a housing external threaded section of the first end of the housing, wherein the valve is disposed in the housing connector, wherein the piston spring is disposed between a bottom portion of the housing connector and the housing chamber.

3. The tire inflation apparatus of claim 2, wherein:
the cap body further comprises a pressure spring, wherein the pressure spring is disposed between the pressure cap and the housing connector, wherein the pressure spring is configured to bias the valve.

4. A method of maintaining air pressure in a tire, the method comprising:

embedding a tire inflation apparatus inside of the tire, the tire inflation apparatus comprising:
a housing, wherein the housing comprises a first end and a second end;
a piston disposed within the housing, the piston comprising a plurality of piston apertures, wherein the plurality of piston apertures are in fluid communication with each other;
a piston spring disposed within a housing chamber in the housing, wherein a volume between a first end of the piston and the first end of the housing partially defines the housing chamber, and wherein the spring is configured to bias the piston along a length of the housing;
a housing cap configured for engagement with the first end of the housing, wherein the housing cap comprises a cap body and a valve; and
a bladder coupled to the second end of the housing, the second end opposing the first end, wherein a volume of the bladder is configured to permit fluid communication with the piston;
sealing air in the bladder when the bladder and the housing chamber have the same air pressure, wherein the air in the bladder urges the piston to a position such that there is no fluid communication between the bladder and the housing chamber;
forcing air into the tire from the housing chamber when the bladder is compressed, whereby the compressed bladder forces air to urge the piston to a position such that the piston is in fluid communication with the plurality of piston apertures; and
forcing air into the housing chamber through the housing cap, thereby enabling air to be forced into the tire via the piston when the bladder is subsequently compressed.

5. The method of claim 4, wherein the valve comprises at least one air inlet configured to permit fluid communication between the cap and the housing chamber in a first direction, the valve further comprises at least one air outlet configured to permit fluid communication between the cap and the housing chamber in a second direction.

6. The method of claim 4, wherein:
the plurality of piston apertures comprises a first piston aperture and a second piston aperture, the first piston aperture configured for fluid communication with the housing chamber, and the second piston aperture configured to permit fluid communication with the tire when the piston is disposed at a first position along the length of the housing.

7. The method of claim 6, wherein the cap body comprises a pressure cap and a housing connector, wherein the pressure cap has a cap internal threaded section configured for engagement with a housing connector external threaded section of the housing connector, wherein the housing connector has a housing connector internal threaded section configured for engagement with a housing external threaded section of the first end of the housing, wherein the valve is disposed in the housing connector, wherein the piston spring is disposed between a bottom portion of the housing connector and the housing chamber.

8. The method of claim 7, wherein the housing cap further comprises a pressure spring, wherein the pressure spring is disposed between the pressure cap and the housing connector, wherein the pressure spring is configured to bias the valve.

* * * * *